Figure 1:
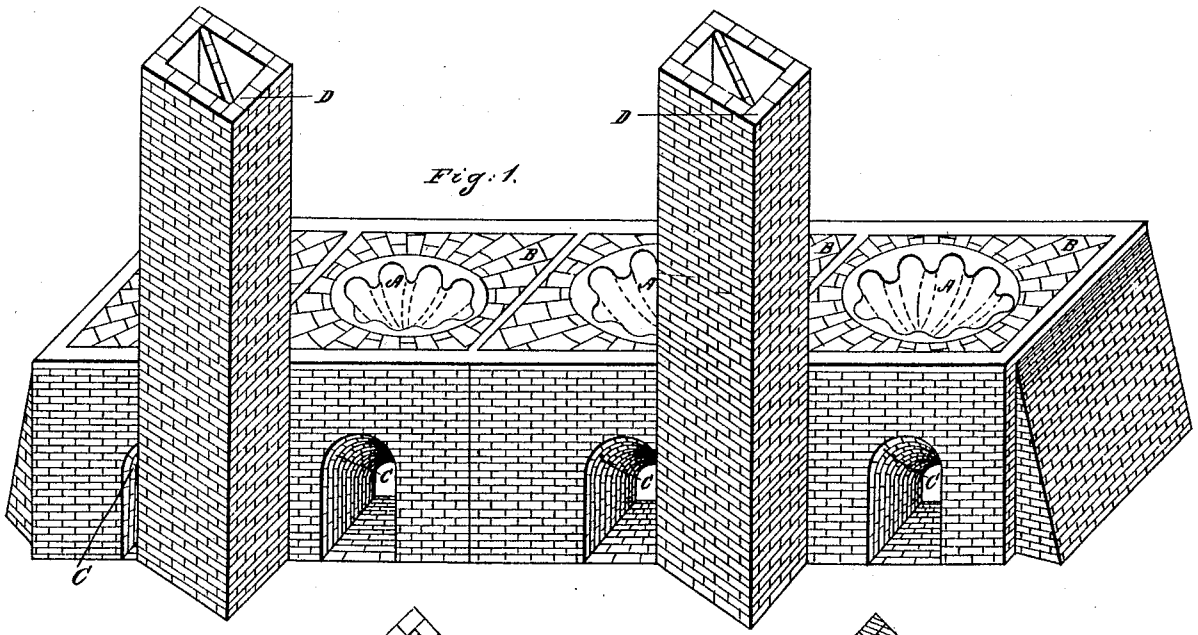
Figure 2:
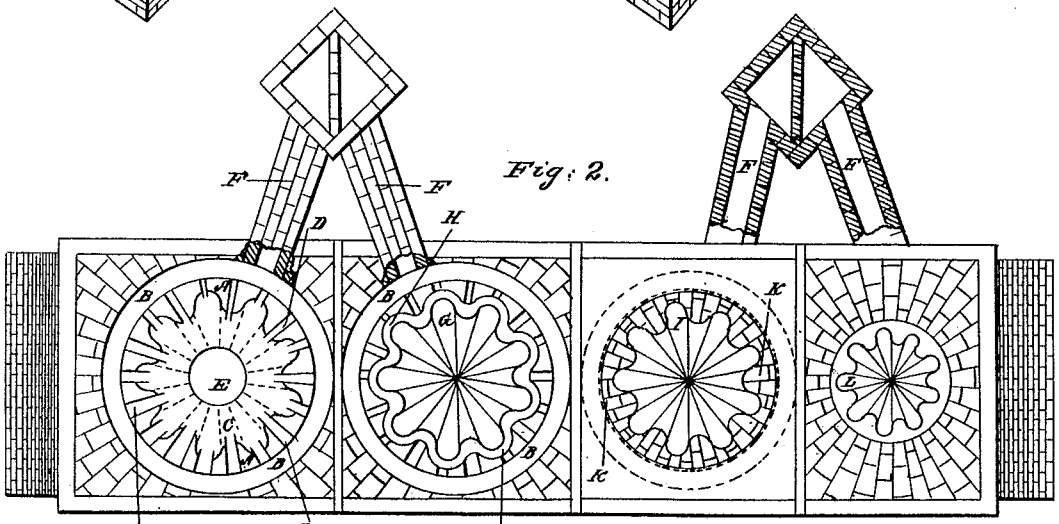

2 Sheets—Sheet 1.

L. H. LEFEBVRE.

Evaporating Pan.

No. 263.

A. I. Patented Jan. 24, 1860.

Witnesses:
James Clancy.
W. Kains Jones.

Inventor:
L. Lefebvre.
per Geo. Patten.
atty.

N. PETERS. Photo-Lithographer. Washington. D. C.

2 Sheets—Sheet 2.
L. H. LEFEBVRE.
Evaporating Pan.
No. 263.
A. I. Patented Jan. 24, 1860.
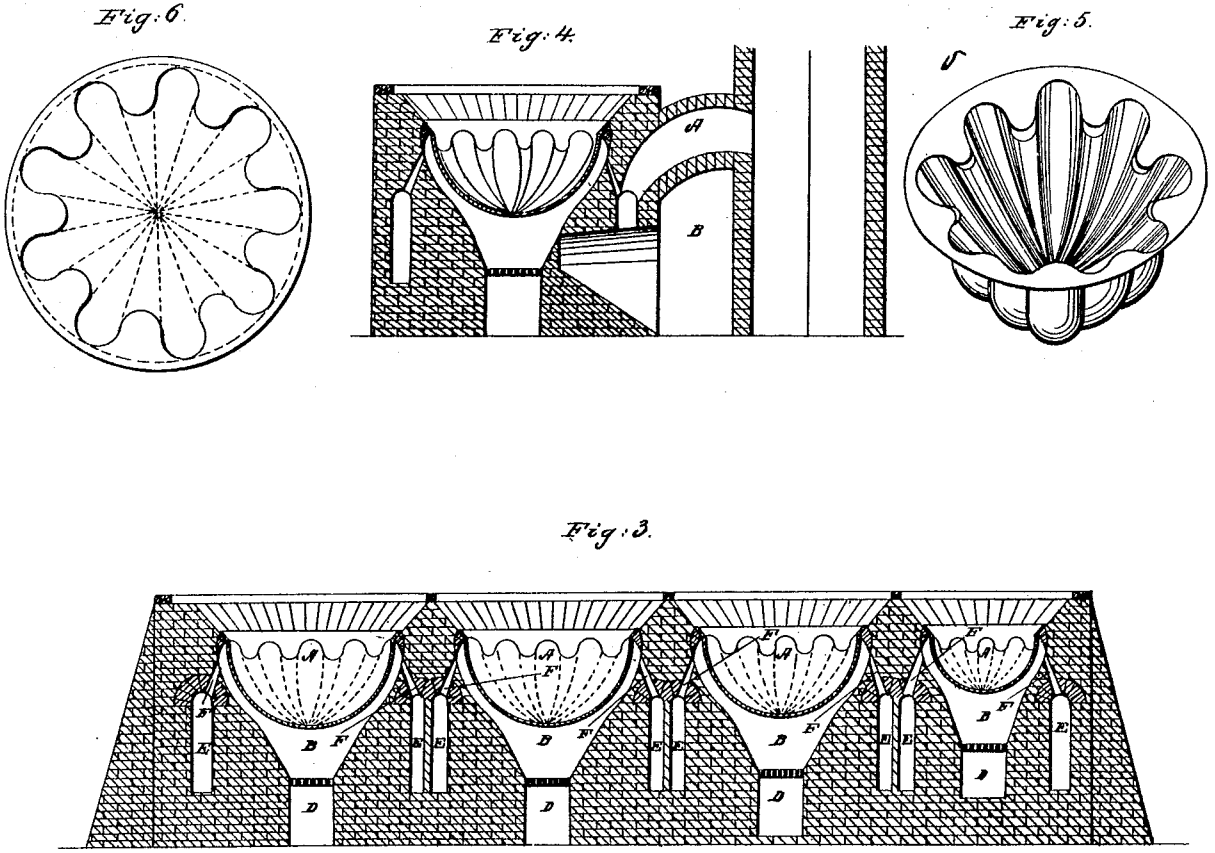
Witnesses.
James Blair
W. Kerr Bragg
Inventor:
L. Lefebvre.
per Geo Patten
atty.
N. PETERS. Photo-Lithographer, Washington, D. C.